US006254960B1

(12) United States Patent
Chen

(10) Patent No.: US 6,254,960 B1
(45) Date of Patent: Jul. 3, 2001

(54) MEMO BLOCK

(75) Inventor: Liang-Ji Chen, Tainan (TW)

(73) Assignee: Dashern Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/290,229

(22) Filed: Apr. 13, 1999

(51) Int. Cl.[7] .................................. B32B 3/14; B32B 3/16

(52) U.S. Cl. ............................. 428/77; 428/40.1; 428/84; 428/192; 428/211

(58) Field of Search .............................. 428/192, 89, 211, 428/79, 40.1, 81, 77, 84

(56) References Cited

U.S. PATENT DOCUMENTS 5,286,546 * 2/1994 Su ........................................ 428/194
5,464,672 * 11/1995 Jackson .................................. 428/40

FOREIGN PATENT DOCUMENTS

11334251 * 12/1999 (JP) .

OTHER PUBLICATIONS

JP 11334251A abstract, T. Seike; Dec. 07, 1999; Memo Block.*

* cited by examiner

*Primary Examiner*—Bruce H. Hess
*Assistant Examiner*—B. Shewareged
(74) *Attorney, Agent, or Firm*—Rosenberg, Klein & Lee

(57) ABSTRACT

A memo block in the present invention is composed by a pile of notepapers. In a proper section near the fore edge of each notepaper is provided with predetermined designs or advertisement. The fore surface of the memo block is cut by a predetermined mode from the first page to the bottom page so as to form a wavy surface, and then the fore surface is pushed backward by a paper-regulating machine to form a proper slope. The rear surface of the memo block is also form a same slope with that of the fore surface. The rear outward slope is cut off to be a vertical plane surface, and then the rear plane surface is glued to form a spine. Thus, the designs or advertisement of he memo block can gradually change paper by paper and have the genuinely vivid and solid advertising effects because of the wavy and oblique fore surface.

2 Claims, 5 Drawing Sheets

MEMO BLOCK

BACKGROUND OF THE INVENTION

1. Field of the Invention

The present invention relates to a memo block with slant and wavy fore surface, more particularly to a memo block which is provided with predetermined designs or advertisement on the wavy fore surface so as to have the effects of being solid, vivid and attractive.

2. Description of the Related Art

Referring to FIG. 1, a conventional memo block 100 is composed by a pile of notepapers 101, and in a proper section 102 near the fore edge of each notepaper 101 is provided with predetermined designs or advertisement. The rear edges opposite to the proper sections 102 of the pile of notepapers 101 are fixed together by glue to form a spine. The proper sections 102 near the fore edges of the notepapers 101 are obliquely cut from the first page 103 to the bottom page 104 to form an outward oblique surface 105 so as to make the designs or advertisement gradually change paper by paper and look vivid and solid.

However, the above-mentioned prior art of the memo block is found to have following defects:

1. The fore edges of the conventional memo block are cut to form an outward oblique surface (about 45 degrees) but it can only have the plane effect and can not present the solid effect.
2. While the mentioned conventional memo block being spread out, the displaying effect makes not so much difference from that of a spread-out common memo block.

SUMMARY OF THE INVENTION

Accordingly, the present invention is directed to a memo block which can substantially obviates the defects of the related conventional memo block.

An object of the present invention is to provide a memo block which is provided with a wavy fore surface so as to make the predetermined designs or advertisement look genuinely solid and vivid.

Another object of the present invention is to provide a memo block which can display a solid, vivid and attractive outlook while the memo block being spread out to form a semicircle so as to achieve the advertising effect and have visual sense of beauty.

To achieve these advantages, the present invention provides a memo block, which is composed by a pile of notepapers. In a proper section near the fore edge of each notepaper is provided with predetermined designs or advertisement. The fore surface of the memo block is cut by a predetermined mode from the first page to the bottom page so as to form a wavy surface, and then the fore surface is pushed backward by a paper-regulating machine to form a proper slope. The rear surface of the memo block also forms a same slope with that of the fore surface. The rear outward slope is cut off to be a vertical plane surface, and then the rear plane surface is glued to form a spine. Thus, the designs or advertisement of the memo block can gradually change paper by paper and have the genuinely vivid and solid advertising effect because of the wavy and oblique fore surface.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 7:
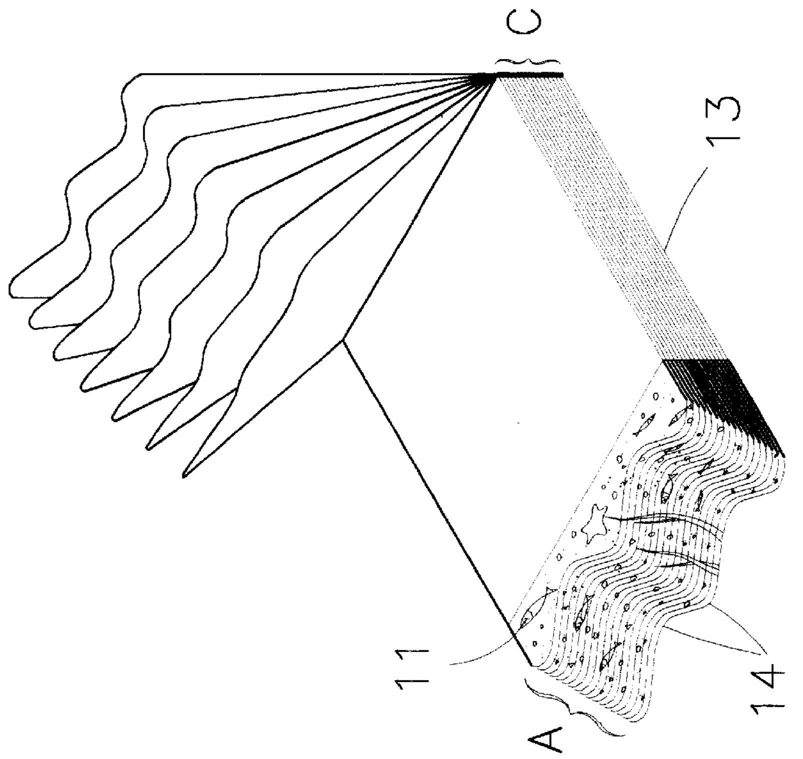
FIG. 7 is a perspective view of an embodiment of the memo block being partially spread out in accordance with the present invention.
Figure 1:
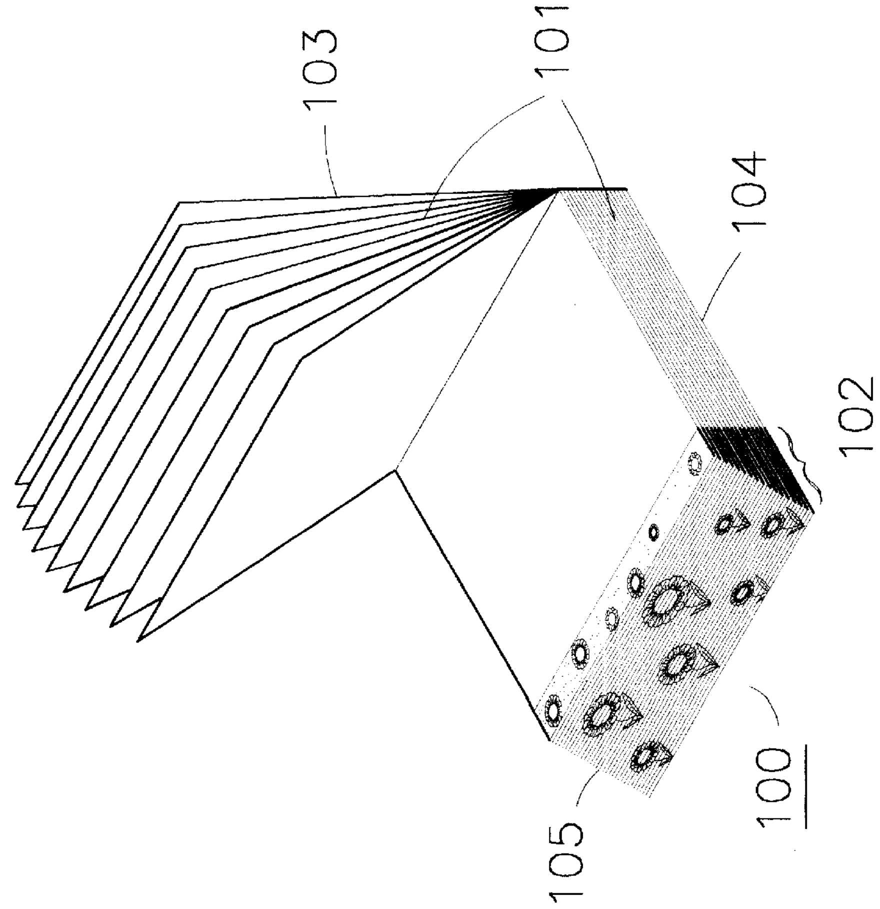
FIG.1 (PRIOR ART)
FIG. 1 is a perspective view of a conventional memo block being partially spread out.
Figure 3:
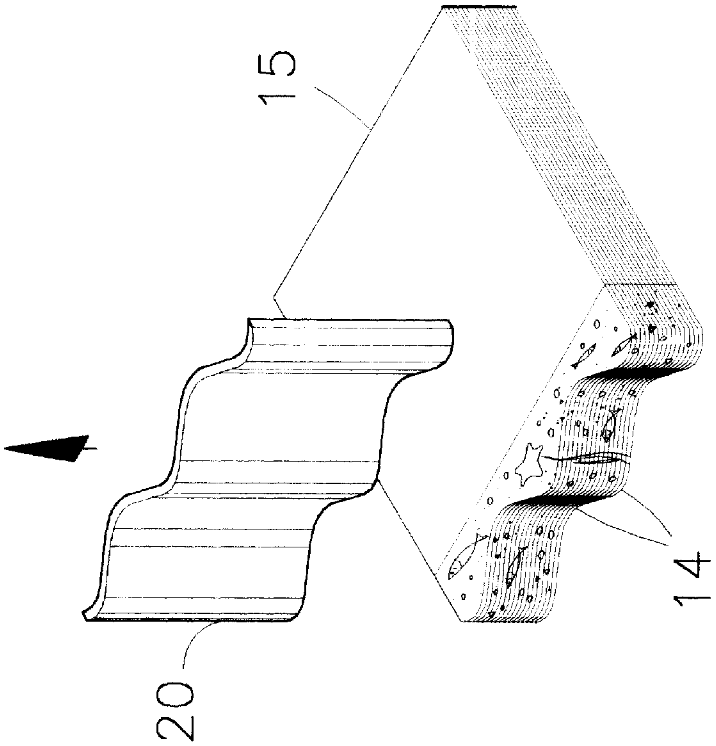
FIG. 3 is a schematic view of an embodiment of the memo block being cut by a mode to form a wavy fore surface in accordance with the present invention.
Figure 2:
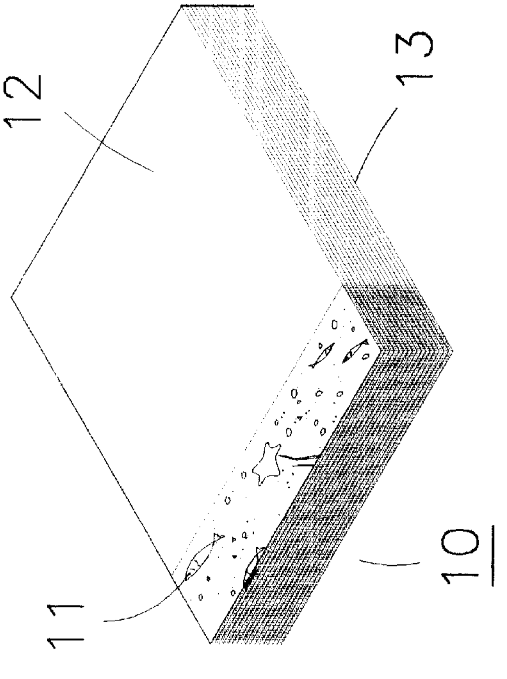
FIG. 2 is a perspective view of an embodiment of the memo block being provided with predetermined designs in the fore section of each notepaper in accordance with the present invention.
Figure 4:
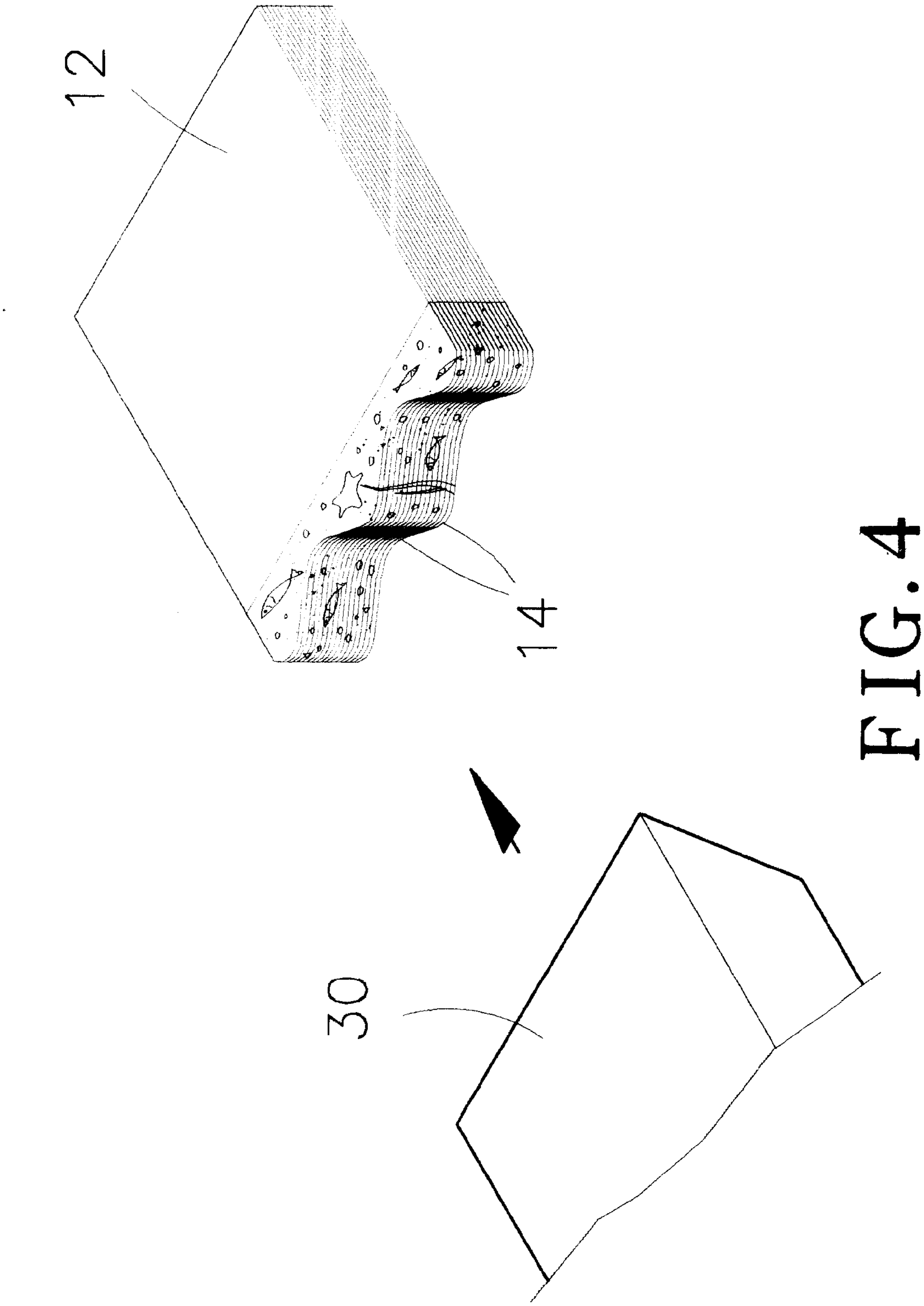
FIG. 4 is a schematic view of an embodiment of the memo block going to be pushed by a paper-regulating machine to form a proper slope on the fore surface in accordance with the present invention.
Figure 6:
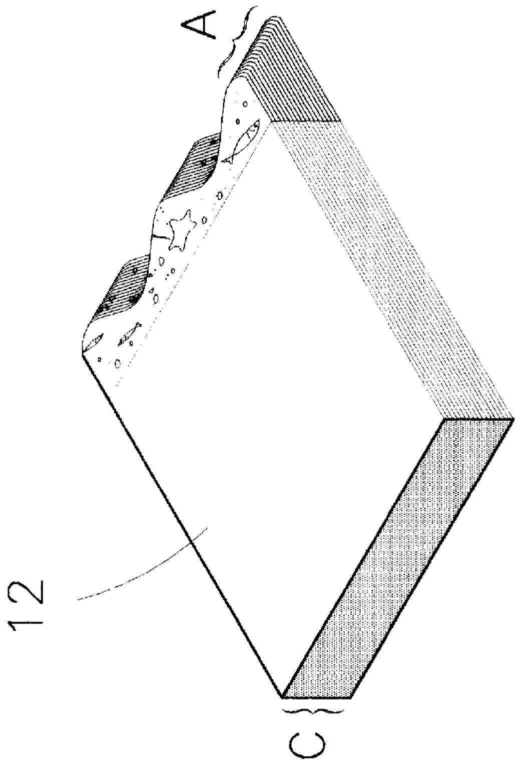
FIG. 6 is a perspective rear view of an embodiment of the memo block whose rear surface has been glued to form a spine in accordance with the present invention.
Figure 5:
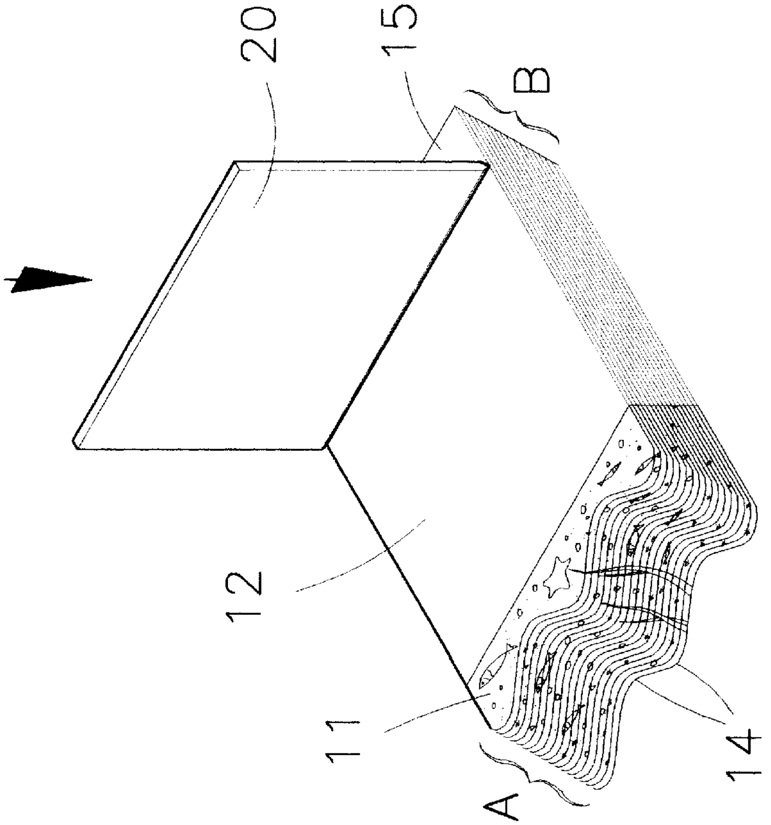
FIG. 5 is a schematic view of an embodiment of the memo block whose rear protruding slope is cut off to be a vertical surface in accordance with the present invention.
Figure 8:
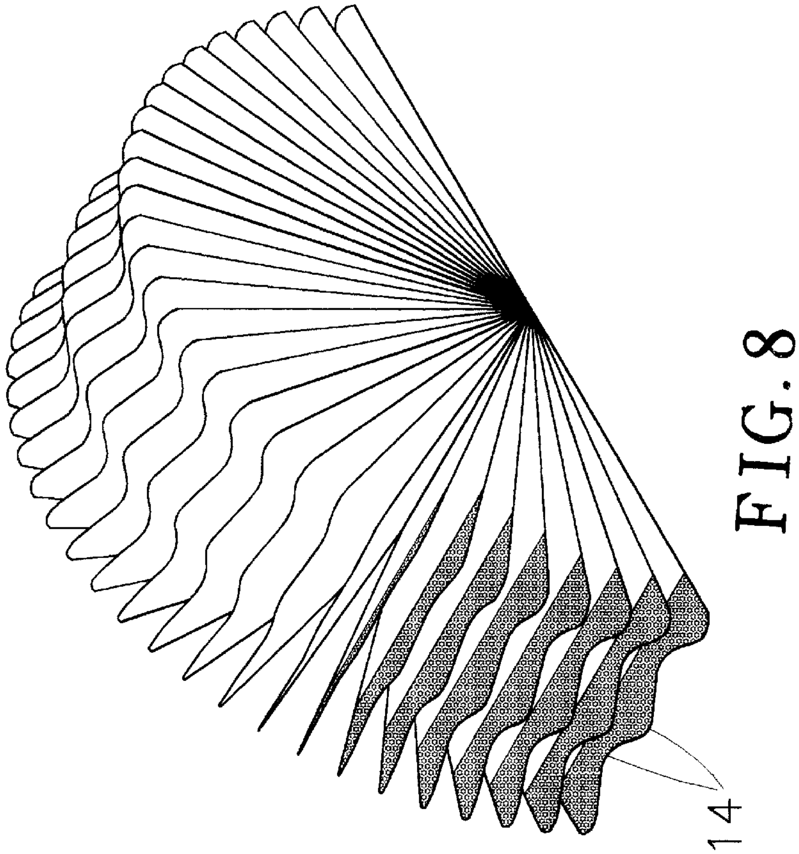
FIG. 8 is a perspective spread-out view of an embodiment of the memo block in accordance with the present invention; and, FIG. 9 is a perspective view of an embodiment of the memo block in accordance with the present invention.
Figure 9:
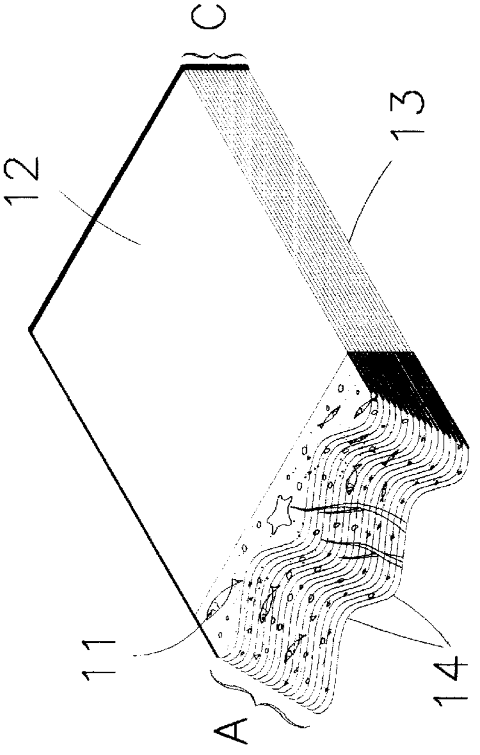

Referring to FIGS. 2 to 9, a preferred embodiment of a memo block in the present invention is composed by a pile of notepapers. Predetermined designs or advertisement are provided in the fore section 11 of each notepaper. The fore section 11 of the memo block 10 is cut by a predetermined mode 20 from the first page 12 to the bottom page 13 to form a wavy surface 14. Then, the fore section 11 is pushed backward by a paper-regulating machine 30 to form a proper slope A (about 45 degrees), and thus the rear surface 15 of the memo block 10 also forms a same slope B with the slope A of the fore section 11. After the protruding portion of the slope B of the rear surface 15 being cut off by a mode 20 to form a vertical plane surface C, the plane surface C is glued to form a spine. Therefore, the memo block with a slant and wavy fore surface is finished so as to make the predetermined designs or advertisement look genuinely solid, vivid and attractive.

While the preferred embodiments of the invention have been described above, it will be recognized and understood that various modifications may be made therein and the appended claims are intended to cover all such modifications which may fall within the spirit and scope of the invention.

What is claimed is:

1. A memo block comprising a plurality of note papers stacked one upon another, each of said plurality of note papers having predetermined indicia formed thereon at an end portion, said end portion of each said note paper having an undulating contour, said end portion of each said note paper being displaced from underlying ones of said plurality note papers to form a side of said stacked note papers having an undulating surface inclined at a predetermined angle, said stacked note papers having another side to form a spine.

2. The memo block of claim 1 where said predetermined angle approximates 45 degrees.

* * * * *